US012749468B2

(12) United States Patent
Wang et al.

(10) Patent No.: US 12,749,468 B2
(45) Date of Patent: Sep. 29, 2026

(54) ELECTRONIC DRUM STAND

(71) Applicant: NINGBO KINLIN ELECTRONIC TECHNOLOGY CO., LTD., Ningbo (CN)

(72) Inventors: Fuguo Wang, Ningbo (CN); Lei Huang, Ningbo (CN)

(73) Assignee: NINGBO KINLIN ELECTRONIC TECHNOLOGY CO., LTD., Ningbo City (CN)

( * ) Notice: Subject to any disclaimer, the term of this patent is extended or adjusted under 35 U.S.C. 154(b) by 308 days.

(21) Appl. No.: 18/724,228

(22) PCT Filed: Apr. 11, 2023

(86) PCT No.: PCT/CN2023/087492
§ 371 (c)(1),
(2) Date: Jun. 26, 2024

(87) PCT Pub. No.: WO2023/207575
PCT Pub. Date: Nov. 2, 2023

(65) Prior Publication Data

US 2025/0095616 A1 Mar. 20, 2025

(30) Foreign Application Priority Data

Apr. 24, 2022 (CN) ......................... 202220953765.7

(51) Int. Cl.
*G10G 5/00* (2006.01)
*G10D 13/10* (2020.01)

(52) U.S. Cl.
CPC ............. *G10G 5/005* (2013.01); *G10D 13/26* (2020.02)

(58) Field of Classification Search
CPC .......... G10G 5/005; G10G 5/00; G10D 13/26; G10D 13/02; G10D 13/28; G10H 1/32; G10H 3/12
See application file for complete search history.

(56) References Cited

U.S. PATENT DOCUMENTS 5,929,355 A 7/1999 Adinolfi
6,073,999 A * 6/2000 Crane .................... G10G 5/005
84/421

FOREIGN PATENT DOCUMENTS

CN 104900221 9/2015
CN 107578722 Y 1/2018
(Continued)

OTHER PUBLICATIONS

International search report of PCT/CN2023/087492.

*Primary Examiner* — Kimberly R Lockett
(74) *Attorney, Agent, or Firm* — Getech Law LLC; Jun Ye

(57) ABSTRACT

The present disclosure discloses an electronic drum stand, and relates to the technical field of musical instrument stands. The electronic drum stand includes a U-shaped stand and two bases. The stand comprises a horizontally arranged horizontal tube and two vertically arranged vertical tubes, and the horizontal tube and the two vertical tubes are integrally bent to form the stand; each of the two bases is connected to a hollow and vertically arranged supporting tube; the two vertical tubes of the stand are correspondingly movably inserted into the supporting tubes of the two bases; the stand can slide up and down relative to the bases to adjust the height; locking mechanisms are arranged between the vertical tubes and the supporting tubes; and the locking mechanisms can lock and fix the vertical tubes on the supporting tubes. The electronic drum stand has a simple design structure and is convenient to mount; the height of the
(Continued)

stand can be adjusted according to the height of a user; and meanwhile, the integral forming design reduces unnecessary connectors, improves the stability, relieves material management of an enterprise, and achieves effects of reducing the cost and increasing the benefit.

10 Claims, 4 Drawing Sheets

(56) References Cited

FOREIGN PATENT DOCUMENTS

| | | |
|---|---|---|
| CN | 211375825 | 8/2020 |
| CN | 213583078 | 6/2021 |
| CN | 307505637 P | 8/2022 |
| TW | M444581 Y | 1/2013 |

* cited by examiner

ELECTRONIC DRUM STAND

TECHNICAL FIELD

The present disclosure relates to the technical field of musical instrument stands, and in particular, to an electronic drum stand.

BACKGROUND

An electronic drum stand is equipment configured to support an electronic drum. The existing electronic drum stand includes two bottom horizontal tubes, two supporting leg tubes fixedly mounted on the bottom horizontal tubes, a fixed horizontal tube fixed between the two supporting leg tubes, and two mobile horizontal tubes movably connected to the supporting leg tubes.

The defect of this technology is that after a drum and a cymbal are mounted on the stand, since each stand is spliced, when a drummer strikes the musical instruments, a slightly excessive impact force would cause the stand to shake, resulting in poor stability of the stand and ultimately affecting the striking effects of the musical instruments.

Moreover, the stand body has an unadjustable height. Only limited up-down fine adjustment can be achieved through connectors of the musical instrument. During mounting of each horizontal tube and the corresponding fixed supporting leg tube, a screwdriver needs to be used to lock bolts on the connectors. The mounting process is complicated and many structures are required to be used. Adding materials easily leads to inconvenient material management in a production management process in a factory. During delivery and packaging in a warehouse, omissions and wrong delivery easily occur.

SUMMARY

To solve the defect in the above technology, the present disclosure provides an electronic drum stand which has a simple structure, is convenient to mount, and has an adjustable height.

To achieve the above objectives, the present disclosure is implemented through the following solutions. An electronic drum stand includes a U-shaped stand and two bases. The stand includes a horizontally arranged horizontal tube and two vertically arranged vertical tubes, and the horizontal tube and the two vertical tubes are integrally bent to form the stand; each of the two bases is connected to a hollow and vertically arranged supporting tube; the two vertical tubes of the stand are correspondingly movably inserted into the supporting tubes of the two bases; the stand can slide up and down relative to the bases to adjust the height; locking mechanisms are arranged between the vertical tubes and the supporting tubes; and the locking mechanisms can lock and fix the vertical tubes on the supporting tubes.

Advantages and active effects of the present disclosure are as follows: The electronic drum stand includes the horizontally arranged horizontal tube and the two vertically arranged vertical tubes; and the horizontal tube and the two vertical tubes are integrally bent and formed. The integrated formation can reduce the quantity of unnecessary connectors and unnecessary locking actions and improve the overall consistency and stability, so that the reduction of the quantity of connectors can relieve the material management of an enterprise, reduce the management cost and the redundant material cost, and facilitate the mounting. Locking mechanisms for connecting a musical instrument can be placed on the horizontal tubes and the vertical tubes. According to the stand, the supporting tubes are arranged on the two bases; the hollow supporting tubes are arranged on the bases; the vertical tubes can be interpenetrated into the supporting tubes and can move up and down in the supporting tubes to adjust the height of the entire stand; the locking mechanisms for locking are arranged between the vertical tubes and the supporting tubes; and after the height of the stand has been adjusted, the locking mechanisms can be used for fixing, so that the stand can adapt to drummers with different heights.

Preferably, each locking mechanism includes a supporting ring connected to an upper end of the supporting tube and a locking ring sleeving the vertical tube; the locking ring is provided with two ear plates; an elastic gap communicated to a center hole of the locking ring and having an upper end penetrating through a top wall of the locking ring is provided on the locking ring between the two ear plates; and the two ear plates are connected with locking screws that lock the vertical tube onto the locking ring. This setting can lock the two ear plates on the locking ring by the locking screws. The elastic gap between the ear plates can press and deform the ear plates at the two ends towards the middle during locking, thus reducing an aperture of the locking ring and achieving an effect of locking the vertical tube.

Preferably, a lower end of the locking ring extends downwards to be provided with an extension section; and an annular cavity for inserting the upper end of the supporting tube is formed between an outer side wall of the extension section and an inner wall of the supporting ring. In this setting, the upper end of the supporting tube is directly inserted into the annular cavity, thus increasing the thickness of a connection and enhancing the overall connection strength.

Preferably, the ear plates include a first ear plate and a second ear plate; a through hole for allowing a bolt to pass through is provided on the first ear plate; a hexagonal nut groove is provided in the second ear plate; and a hexagonal nut matched with the bolt is placed in the hexagonal nut groove. This setting can lock the bolt on the hexagonal nut through the through hole; and the hexagonal nut is limited in the hexagonal nut groove, and can be mounted using a higher torsion, so that the stability of a connection is improved.

Preferably, an open U-shaped groove is provided at an upper part of the supporting tube; and a key matched with a shape of the U-shaped groove is arranged in the locking mechanism. This setting can mount the supporting tube in the locking mechanism in a fixing direction to ensure that a mounting direction of a supporting horizontal tube is always correct.

Preferably, each base includes a supporting horizontal tube; and a through hole configured to fixedly connect each supporting tube is provided in the middle of the supporting horizontal tube. In this setting, the supporting tube is directly placed in the through hole of the supporting horizontal tube, which can reduce other unnecessary connectors.

Preferably, an adjustment unit configured to adjust the balance is arranged at one end of the supporting horizontal tube; the adjustment unit includes a bolt provided with a circular arc surface at a bottom, a first through hole provided on the supporting horizontal tube and allowing a bolt to pass through, and a nut that is matched and connected to the bolt; and the nut is fixedly connected to the first through hole. In this setting, a unilateral height of the supporting horizontal tube is slightly adjusted through bolt connection, so that the stand can be erected even on an uneven ground. The bolt with the circular arc surface can not only enhances the aesthetics, but also adapt to various uneven road surfaces.

Preferably, two ends of the supporting horizontal tube are connected with soft foot covers. In this setting, a great vibration will be generated during the playing of a percussion instrument. When the vibration is directly transmitted to the ground, there will be feedback of the same reaction force, thus increasing the amplitude and intensity of the vibration. The soft foot covers can effectively reduce the vibration.

Preferably, each foot cover includes a first foot cover and a second foot cover; the second foot cover extends downwards to be provided with a hollow foot pad; and a second through hole for allowing the bolt to pass through is provided on the first foot cover. This setting can reduce the impact of the vibration and further eliminate the vibration by using the soft foot covers. Meanwhile, this can increase the friction between the supporting horizontal tube and the ground to prevent displacement during the vibration. The second through hole for allowing the bolt to pass through is provided at the other end, which can adjust the balance.

Preferably, a connection between each horizontal tube and each vertical tube is an arc for smooth transition. This setting can smoothly put mounting members for fixing a musical instrument into the horizontal tubes from the vertical tubes, so that the service specification of the mounting members is reduced, and the material management is facilitated.

1: stand; 101: horizontal tube; 102: vertical tube; 2: base; 3: supporting horizontal tube; 201: through hole; 202: first foot cover; 203: second foot cover; 204: foot pad; 301: locking mechanism; 302: supporting tube; 303: locking ring; 304: supporting ring; 305: ear plate; 306: elastic gap; 307: bolt; 308: hexagonal nut; 309: first ear plate; 310: second ear plate; 311: through hole; 312: U-shaped groove; 313: key; 314: annular cavity; 315: hexagonal nut groove; 4: adjustment unit; 401: bolt; 402: nut; 403: first through hole; and 404: second through hole.

DETAILED DESCRIPTION OF THE EMBODIMENTS

The technical solutions in the embodiments of the present disclosure are clearly and completely described below in combination with the above accompanying drawings. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Figure 1:
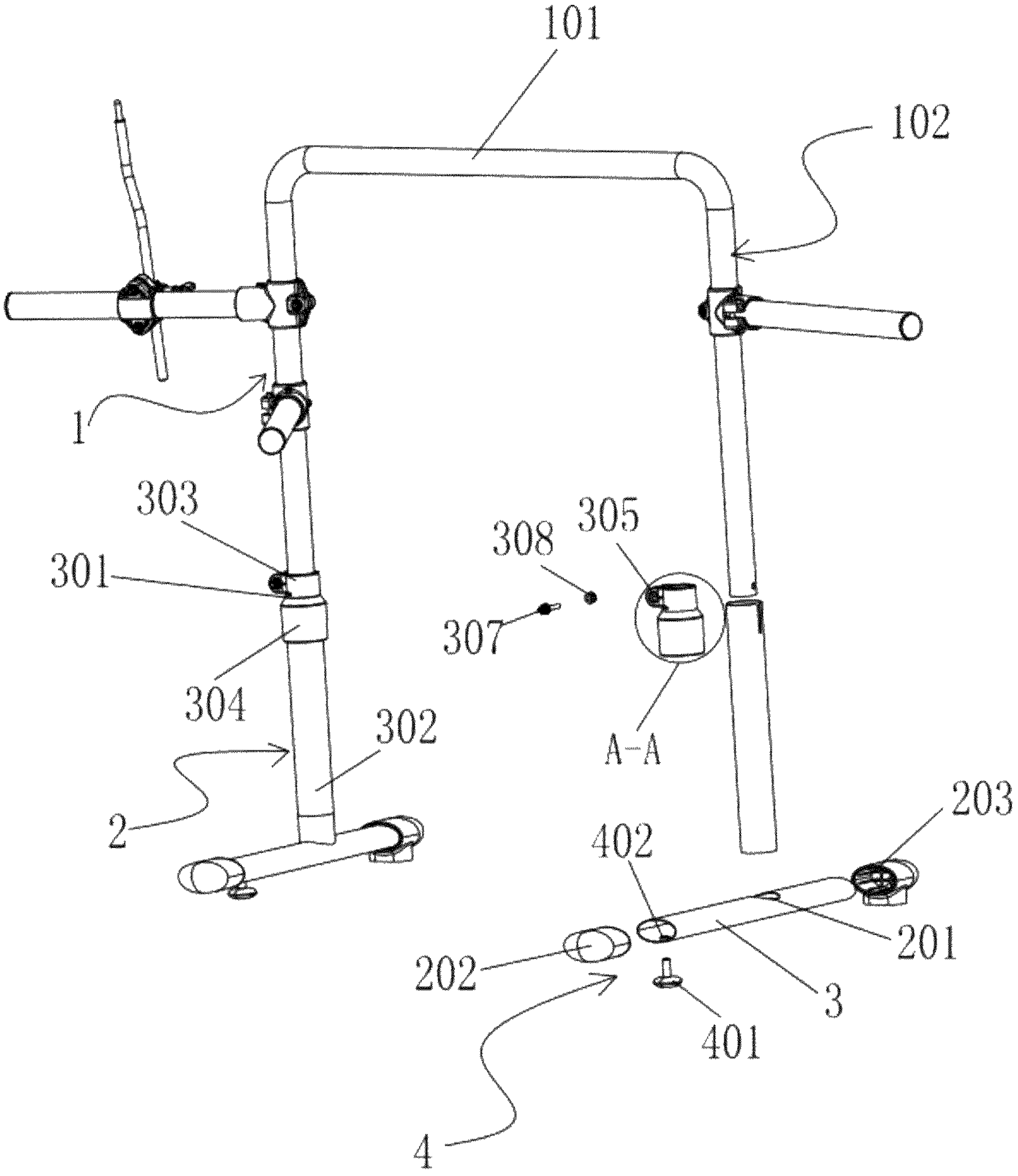
FIG. 1 is an exploded view of an electronic drum stand according to the present disclosure.

As shown in FIG. 1, an electronic drum stand provided by an embodiment of the present disclosure has a effect of facilitating the mounting. The electronic drum stand includes a U-shaped stand 1 configured to mount an electronic drum and an electronic cymbal, and bases 2 configured to support the electronic drum stand. The stand 1 includes a horizontally arranged horizontal tube 101 and two vertically arranged vertical tubes 102. The horizontal tube 101 and the two vertical tubes 102 are integrally bent and formed. This can facilitate mounting members connected to a musical instrument to be threaded into the horizontal tubes 101. Furthermore, the integral formation manufacturing mode can improve the overall consistency and stability of the stand 1, which saves unnecessary connectors and redundant locking actions, so that the whole mounting process is simple and convenient.

Figure 2:
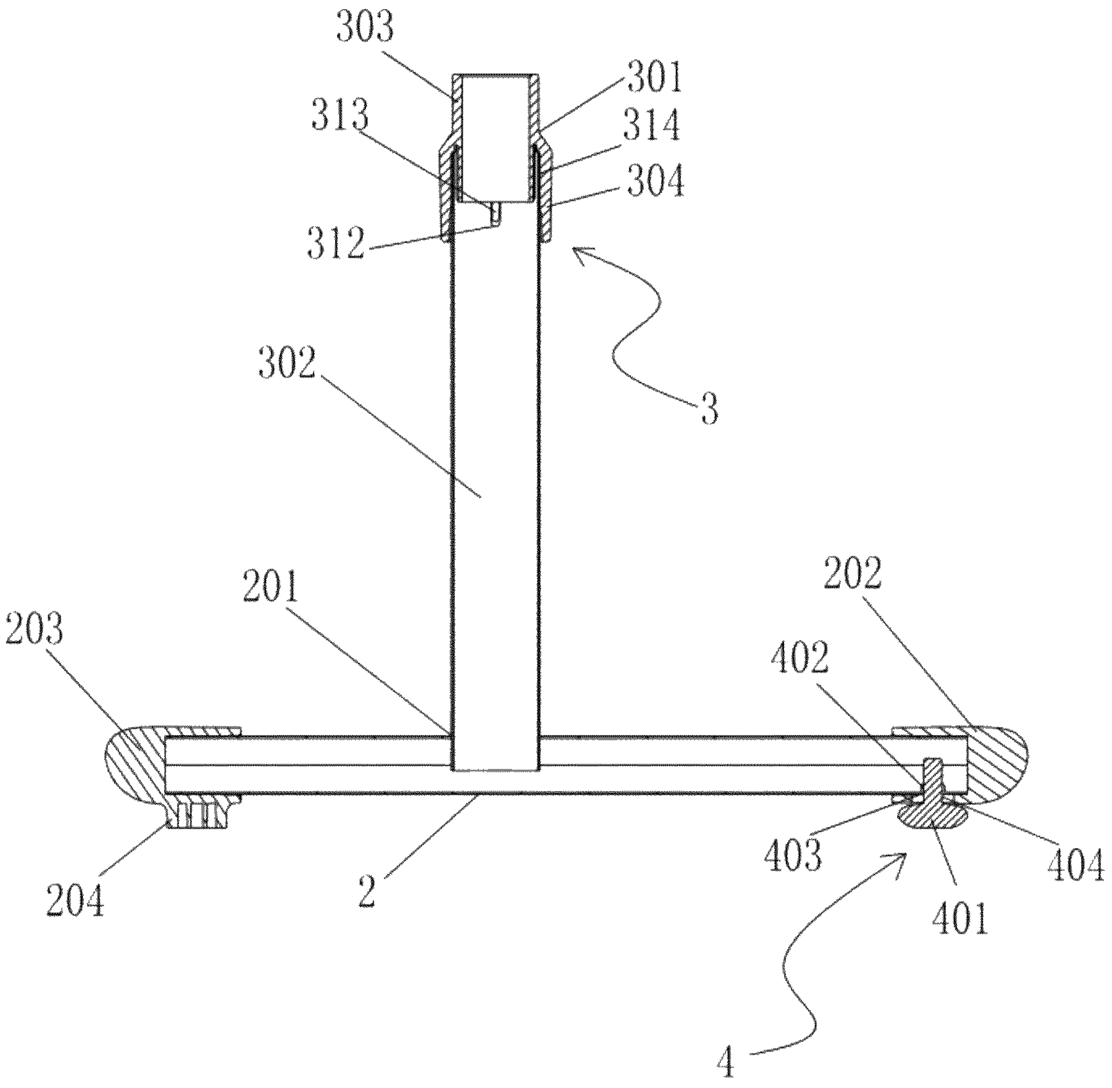
FIG. 2 is sectional view of a base of an electronic drum stand according to the present disclosure.

As shown in FIG. 2, the height of this electronic drum stand in this embodiment can be adjusted. Each base 2 includes a supporting tube 302 and a locking mechanism 301 configured to connect the supporting tube 302 to each vertical tube 102. An outer diameter of the vertical tube 102 is less than an inner diameter of the supporting tube 302. In this way, the vertical tube 102 can be directly threaded into the supporting tube 302 and move up and down in the supporting tube 302. A user can adjust a threading depth of the vertical tube 102 according to the own height and finally fix the vertical tube by using the locking mechanism 301.

Figure 3:
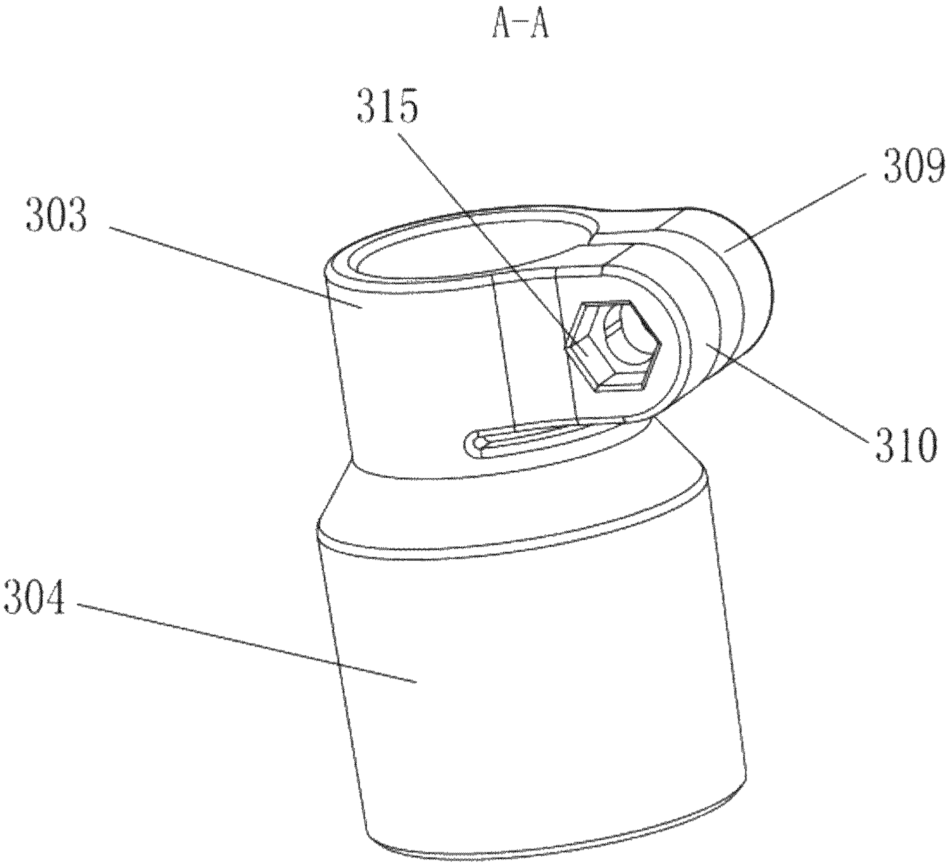
FIG. 3 is an enlarged view of a locking mechanism of an electronic drum stand according to the present disclosure.
Figure 4:
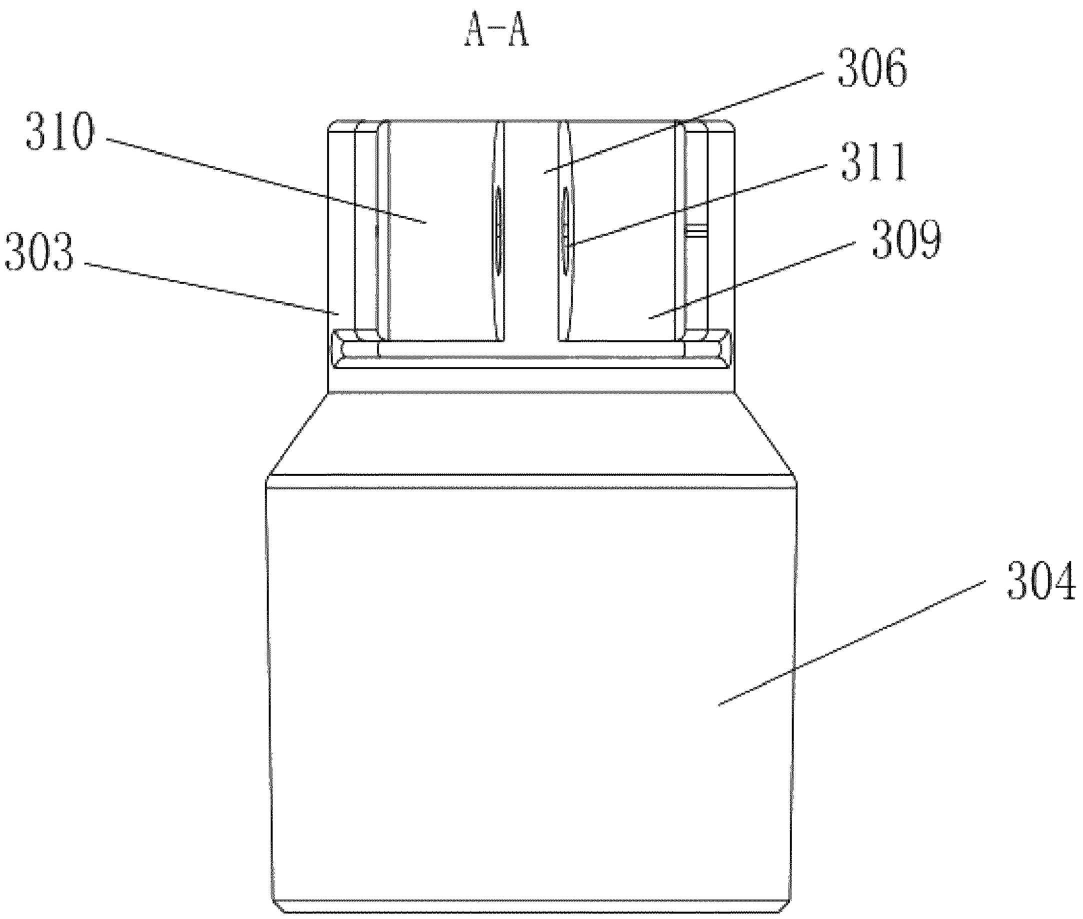
FIG. 4 is an enlarged view of another visual angle of a locking mechanism of an electronic drum stand according to the present disclosure.

As shown in FIG. 3 to FIG. 4, to further optimize the above solution, the locking mechanism 301 includes a locking ring 303 and a supporting ring 304 arranged below the locking ring 303. An outer diameter of the locking ring 303 is less than an outer diameter of the supporting ring 304. Two ear plates 305 are arranged on the locking ring 303 and include a first ear plate 309 and a second ear plate 310. A through hole 311 for allowing a bolt 307 to pass through is provided in the middle of the first ear plate 309. A hexagonal nut groove 315 is provided in the second ear plate 310 and is configured to place a hexagonal nut 308 matched with the bolt 307. The hexagonal nut 308 can provide a higher mounting torsion for bolt connection to ensure the overall stability. An elastic gap 306 penetrating through a top wall of the locking ring 303 is provided on the locking ring 303 between the two ear plates 305 and is configured to lock the two ear plates 305 on the locking ring 303 during locking. By the arrangement of the elastic gap 306, the first ear plate 309 and the second ear plate 310 can be pressed and deformed towards the middle during locking, thereby reducing an aperture of the locking ring 303 and achieving an effect of locking the vertical tube 102.

To further optimize the above solution, a lower end of the locking ring 303 extends downwards to be provided with an extension section; and an annular cavity 314 for inserting the upper end of the supporting tube 302 is formed between an outer wall of the extension section and an inner wall of the supporting ring 304. The vertical tube 102 is mounted at an upper part of the supporting tube 302 through the locking ring 304. After mounting, the connected portion has an increased wall thickness, so that the stability and structural strength of a connection can be improved.

As shown in FIG. 2, this electronic drum stand in this embodiment can adjust the balance. An adjustment unit 4 configured to adjust the balance is arranged at one end of the supporting horizontal tube 3. The adjustment unit 4 includes a bolt 401 provided with a circular arc surface at a bottom, a through hole 403 provided on the supporting horizontal tube 3 and allowing a bolt 401 to pass through, and a nut 402 that is matched and connected to the bolt 401. An outer diameter of the nut 402 is greater than an aperture of the through hole 403. The nut 402 is fixedly connected into the supporting horizontal tube 3 in a welded manner. When the bolt 401 is turned, the height of one end of the supporting horizontal tube 3 can be changed, so that the electronic drum stand can be erected in a place with an uneven road surface to play music. The bolt 401 with the circular arc surface is applicable to more places relative to a planar bolt 401. In some bumpy roads, the electronic drum stand can be steadily erected.

To further optimize the above solution, two ends of the supporting horizontal tube 3 are connected with soft foot covers. Each foot cover includes a first foot cover 202 and a second foot cover 203. The first foot cover 202 is supported by the bolt 401 to adjust the balance, and the second foot cover 203 extends downwards to be provided with a hollow foot pad 204. The internal hollow design of the foot pad 204 better reduces the vibration generated during playing of music and provides more stable striking environment for a drummer.

In an optimal embodiment of this embodiment, the stand 1 includes a horizontally arranged horizontal tube 101 and two vertically arranged vertical tubes 102. The horizontal tube 101 and the two vertical tubes 102 are integrally bent and formed. A bend is transitioned using an arc. In this design mode, unnecessary connectors between the horizontal tube 101 and the vertical tubes 102 are canceled; the warehouse material management is reduced; the overall consistency is improved; and the supporting strength and stability are improved. The stand 1 is supported by the bases 2. Each base 2 includes a supporting tube 302 and a locking mechanism 301 configured to connect the supporting tube 302 to each vertical tube 102. The vertical tube 102 can be directly threaded into the supporting tube 302 through the locking mechanism 301 and move up and down in the supporting tube 302. A user can adjust a threading depth of the vertical tube 102 according to the own height and finally lock and fix the vertical tube by using the locking mechanism 301. The locking mechanism 301 includes a locking ring 303 and a supporting ring 304 arranged below the locking ring 303. An outer diameter of the locking ring 303 is less than an outer diameter of the supporting ring 304. Two parallel ear plates 305 extending in a direction perpendicular to the locking mechanism towards the same side are arranged on the locking ring 303 and include a first ear plate 309 and a second ear plate 310. An elastic gap 306 communicated to a center hole of the locking ring 303 and having an upper end penetrating through a top wall of the locking ring 303 is provided on the locking ring 303 between the first ear plate 309 and the second ear plate 310. By the arrangement of the elastic gap 306, the first ear plate 309 and the second ear plate 310 can be pressed and deformed towards the middle during locking, thereby reducing an aperture of the locking ring 303 and achieving an effect of locking the vertical tube 102. A through hole 311 for allowing a bolt 307 to pass through is provided in the middle of the first ear plate 309. A hexagonal nut groove 315 is provided in the middle of the second ear plate 310 and is configured to place a hexagonal nut 308 matched with the bolt 307. The hexagonal nut 308 can provide a higher mounting torsion for bolt connection to ensure the overall stability. After the vertical tube 102 is inserted into the locking ring 303, a diameter of an inner hole of the locking ring 303 can be reduced through a tension generated by tightening the bolt 307 on the locking mechanism 301, thereby achieving a fixing effect. The supporting tube 302 is directly threaded into a through hole 201 formed in the supporting horizontal tube 3, and is finally welded on the supporting horizontal tube 3 for fixing. Two ends of the supporting horizontal tube 3 are connected with soft foot covers. Each foot cover includes a first foot cover 202 and a second foot cover 203. The second foot cover extends downwards to be provided with a hollow foot pad 204. This can effectively reduce the impact of the vibration. The first foot cover 202 is provided with an adjustment unit 4 configured to adjust the balance. The adjustment unit 4 includes a bolt 401 provided with a circular arc surface, a first through hole 403 provided on the supporting horizontal tube 3 and allowing a bolt 401 to pass through, and a nut 402 that is matched and connected to the bolt 401; and the nut 402 is fixedly connected to an upper end of the first through hole 403 in a welded manner. The bolt 401 is matched with the nut 402 through a second through hole 404 provided on the first foot cover 202 and the first through hole 403. Turning the bolt 401 can level the electronic drum stand, so that the electronic drum stand can be suitable for being erected in places with uneven road surfaces. The electronic drum stand has a simple design structure and is convenient to mount; and meanwhile, the integrally formed horizontal tube and vertical tubes for erecting the musical instrument reduce unnecessary connectors, and can improve the overall consistency and stability. This relieves material management of an enterprise and improves the delivery accuracy and efficiency.

The various embodiments in this specification are described in a progressive manner, and each embodiment focuses on differences from other embodiments. The same and similar parts between all the embodiments can be referred to each other.

The above explanations of the disclosed embodiments enable those skilled in the art to implement or use the present disclosure. The various modifications to these embodiments will be apparent to those skilled in the art, and the general principles defined herein can be implemented in other embodiments without departing from the spirit or scope of the present disclosure. Thus, the present disclosure is not limited to these embodiments shown herein, but accords with the broadest scope consistent with the principles and novel features disclosed herein.

What is claimed is:

1. An electronic drum stand, comprising a U-shaped stand (1) and two bases (2), wherein the stand includes a horizontally arranged horizontal tube (101) and two vertically arranged vertical tubes (102), and the horizontal tube (101) and the two vertical tubes (102) are integrally bent to form the stand (1); each of the two bases (2) is connected to a hollow and vertically arranged supporting tube (302); the two vertical tubes (102) of the stand (1) are correspondingly movably inserted into the supporting tubes (302) of the two bases (2); the stand (1) slides up and down relative to the bases (2) to adjust the height; locking mechanisms (301) are arranged between the vertical tubes (102) and the supporting tubes (302); and the locking mechanisms (301) lock and fix the vertical tubes (102) on the supporting tubes (302).

2. The electronic drum stand according to claim 1, wherein each locking mechanism (301) comprises a supporting ring (304) connected to an upper end of the supporting tube (302) and a locking ring (303) sleeving the vertical tube (102); the locking ring (303) is provided with two ear plates (305); an elastic gap (306) communicated to a center hole of the locking ring (303) and having an upper end penetrating through a top wall of the locking ring (303) is provided on the locking ring (303) between the two ear plates (305); and the two ear plates (305) are connected with locking screws that lock the vertical tube (102) onto the locking ring (303).

3. The electronic drum stand according to claim 2, wherein a lower end of the locking ring (303) extends downwards to be provided with an extension section; and an annular cavity (314) for inserting the upper end of the supporting tube (302) is formed between an outer side wall of the extension section and an inner wall of the supporting ring (304).

4. The electronic drum stand according to claim 2, wherein the ear plates (305) comprise a first ear plate (309) and a second ear plate (310); a through hole (311) for allowing a bolt (307) to pass through is provided on the first ear plate (309); a hexagonal nut groove (315) is provided in the second ear plate (310); and a hexagonal nut (308) matched with the bolt (307) is placed in the hexagonal nut groove (315).

5. The electronic drum stand according to claim 1, wherein an open U-shaped groove (312) is provided at an upper part of the supporting tube (302); and a key (313) matched with a shape of the U-shaped groove (312) is arranged in the locking mechanism (301).

6. The electronic drum stand according to claim 1, wherein each base (2) comprises a supporting horizontal tube (3); and a through hole (201) configured to fixedly connect each supporting tube (302) is provided in the middle of the supporting horizontal tube (3).

7. He electronic drum stand according to claim 6, wherein an adjustment unit (4) configured to adjust the balance is arranged at one end of the supporting horizontal tube (3); the adjustment unit (4) comprises a bolt (401) provided with a circular arc surface at a bottom, a first through hole (403) provided on the supporting horizontal tube (3) and allowing a bolt (401) to pass through, and a nut (402) that is matched and connected to the bolt; and the nut (402) is fixedly connected to the first through hole (403).

8. He electronic drum stand according to claim 7, wherein the two ends of the supporting horizontal tube (3) are connected with soft foot covers.

9. He electronic drum stand according to claim 8, wherein each foot cover comprises a first foot cover (202) and a second foot cover (203); the second foot cover (203) extends downwards to be provided with a hollow foot pad (204); and a second through hole (404) for allowing the bolt (401) to pass through is provided on the first foot cover (202).

10. He electronic drum stand according to claim 1, wherein a connection between each horizontal tube (101) and each vertical tube (102) is an arc for smooth transition.

* * * * *